Patented Jan. 13, 1942

2,269,810

UNITED STATES PATENT OFFICE 2,269,810

RESINOUS COPOLYMERS OF VINYL AROMATIC COMPOUNDS

Robert R. Dreisbach and Sylvia M. Stoesser, Midland, Mich., assignors to The Dow Chemical Company, Midland, Mich., a corporation of Michigan No Drawing. Application October 4, 1938, Serial No. 233,322

8 Claims. (Cl. 260—86)

This invention concerns certain new resinous co-polymers of vinyl aromatic hydrocarbons, particularly co-polymers of styrene with nuclear alkylated styrene containing two or more carbon atoms in the alkyl portion of the molecule.

The new co-polymers are prepared by mixing liquid styrene with a liquid nuclear alkylated styrene and polymerizing the mixture. Examples of such nuclear alkylated styrenes are ethyl styrene, isopropyl styrene, normal propyl styrene, ethyl isopropyl styrene, ethyl methyl styrene, methyl isopropyl styrene, dimethyl tertiary butyl styrene, or mixtures of such alkylated styrenes, etc.

The polymerization may be carried out in any of the usual ways using the materials to be co-polymerized in any desired proportions, but the properties of the resinous co-polymers are influenced markedly both by the polymerization conditions employed and by the proportions of styrene and its homologue used. In nearly all instances the polymerization proceeds smoothly to produce satisfactory products when carried out at temperatures between 60° and 170° C., but it may be carried out at lower or higher temperatures, if desired. Polymerization catalysts such as benzoyl peroxide, etc., can be used to promote the polymerization, but such catalysts tend to reduce the molecular weight and toughness of the co-polymers and they are usually omitted. The reaction is usually continued until a resin which is solid at room temperature is produced and preferably until the polymerization is 95 per cent or more complete, but it may, if desired, be stopped at an intermediate point and the unreacted monomers be removed from the resinous product, e. g. by distillation or extraction. In most instances, heating of the monomeric mixture at 125° C. for three days is sufficient to accomplish 95 per cent or more complete polymerization, but longer heating is sometimes required.

All of the resinous products are colorless transparent thermoplastic resins. Most of them are capable of being molded readily although certain of them have high softening temperatures which render molding difficult unless plasticizers or softening agents are added. All of the resins possess good dielectric properties rendering them useful as electric insulating agents. Many of them swell but do not dissolve appreciably when contacted with the usual solvents for polystyrene, e. g. benzene, toluene, carbon tetrachloride, ethylene chloride, ethyl acetate, etc. The resinous co-polymers containing 50 per cent by weight or more of the alkylated styrene have in most instances been substantially insoluble in such solvents and in some instances employment of as little as 10 per cent by weight of an alkylated styrene has resulted in formation of an insoluble co-polymer.

As hereinbefore indicated, the physical properties, e. g. tensile strength, impact strength, hardness, etc., of the co-polymers of styrene with a given nuclear alkylated styrene of the type herein employed vary considerably with changes in the proportions of said reactants. Accordingly, from styrene and one such alkylated styrene a series of resins may be prepared and in this series each physical property, e. g. tensile strength, varies over a wide range. Within this series, the members vary markedly from one another in their combination of physical properties, i. e. members may be obtained which have a higher tensile strength but are softer than polystyrene prepared under like polymerizing conditions and other members may be found which have higher tensile strength and also are considerably harder than the polystyrene. Thus the members vary from one another as to their suitability for a given purpose and one member may have a combination of properties rendering it superior to the others for the preparation of a given article, e. g. a cigarette case, whereas a different member of the series may be better adapted to use in the preparation of another article, e. g. a comb. One of the advantages of this invention is that it provides for the production of a series of resins having a wide range of physical properties from a small number of starting materials.

In the series of co-polymers prepared from styrene and a given alkylated styrene, e. g. para-ethyl styrene, the properties of the products change most abruptly with a small change in the proportions of the reactants near the extremities of the range of possible co-polymers. For instance, as the proportion of alkylated styrene in the mixture of polymerizable compounds is increased from a mere trace to about 1 per cent by weight the tensile strength of the product increases markedly. Peculiarly, a similar increase in tensile strength occurs when the proportion of styrene in such initial mixture of styrene and alkyl styrene is increased from a trace to about 1 per cent by weight. In most instances, when either of the polymerizable compounds is used in a proportion representing less than 20 per cent of the weight of the mixture of polymerizable compounds, a small change in the proportions of the reactants causes a great change in the tensile strength and other physical properties of the resins from such mixtures. Changes in the properties of the products also occur as the proportion of either reactant in the reaction mixture is raised from 20 to 80 per cent by weight, but such variance in properties occurs more gradually over this range.

For sake of clarity, the foregoing general description of the new resinous products has been restricted to the products obtained by co-polymerizing styrene with only a single nuclear alkylated styrene. It has been shown herein that a series of such simple co-polymers contain members which vary markedly from one another in physical properties. It will be understood that still further modifications in the properties of the resins are obtainable by co-polymerizing styrene together with two or more of such nuclear alkylated styrenes and these relatively complex co-polymers are comprised by the invention. Examples of these complex resins are those obtainable by co-polymerizing styrene together with: a mixture of meta-ethyl styrene and meta-isopropyl styrene; a mixture of ortho-isopropyl styrene and para-ethyl styrene; a mixture of para-ethyl styrene and ortho-para-diethyl styrene; a mixture of ortho-ethyl styrene and para-ethyl styrene; etc.

The following examples describe certain ways in which the principle of the invention has been applied but are not to be construed as limiting the invention.

Example 1

A series of co-polymers of styrene and diethyl vinyl benzene were prepared by heating mixtures of said compounds at a temperature of 125° C. for approximately 72 hours. A sample of each resinous co-polymer was then molded at a temperature of 150° C. into a test piece having the dimensions 0.1 inch by 0.5 inch by 1.75 inches. The tensile strength in pounds per square inch cross section; the impact strength in inch-pounds of energy applied by a blow to cause breakage; the Shore scleroscope hardness; the heat distortion in degrees centigrade; and the electric power factor of each molded piece were then determined in the usual ways. It may be mentioned that, except for the size of the test piece, the methods used in determining the impact strength and the heat distortion are similar to those described in A. S. T. M. D256–34T and A. S. T. M. D48–33, respectively. Other samples of the resins were molded at a temperature of 170° C. into test pieces of the same size and the tensile strength, impact strength, Shore scleroscope hardness, and heat distortion of these molded pieces were similarly measured. The following table gives the composition in per cent by weight of the reaction mixture used in making each resin, the temperature at which the resin was molded and the above-mentioned properties of the resin. For sake of comparison the table also includes a description of polystyrene alone and of the polymer of diethyl vinyl benzene each of which polymers were prepared, molded, and tested as just described.

Table I

| Reaction mixture | | Molding temp. | Tensile strength | Impact strength | Hardness | Heat distortion | Power factor |
|---|---|---|---|---|---|---|---|
| Styrene | Diethyl styrene | | | | | | |
| Percent | Percent | °C. | Lbs. per sq. in. | Inch-lbs. | | °C. | |
| 100 | 0 | 150 | 5,210 | 0.9 | 88 | 80 | 0.032 |
| 99 | 1 | 150 | 6,012 | 1.0 | 78 | 81 | 0.045 |
| 95 | 5 | 150 | 6,270 | 1.2 | 80 | 80 | 0.032 |
| 75 | 25 | 150 | 5,164 | 0.8 | 80 | 70 | 0.055 |
| 50 | 50 | 150 | 2,367 | 0.6 | 77 | 64 | 0.066 |
| 0 | 100 | 150 |  | 0.3 |  |  |  |
| 100 | 0 | 170 | 5,600 | 0.7 | 76 | 63 |  |
| 99 | 1 | 170 | 5,982 | 0.8 | 78 | 81 |  |
| 95 | 5 | 170 | 5,870 | 0.9 | 80 | 80 |  |
| 75 | 25 | 170 | 5,425 | 0.8 | 80 | 77 |  |
| 50 | 50 | 170 | 3,740 | 0.5 | 76 | 54 |  |
| 0 | 100 | 170 | 1,730 | 0.3 | 63 | 54 |  |

Example 2

A polymer of styrene, a co-polymer of a mixture of about 20 per cent ortho- and 80 per cent para-ethyl vinyl benzenes, and co-polymers of styrene with said mixture of ortho- and para-ethyl vinyl benzenes were prepared by heating the reactants at a temperature of 125° C for 72 hours. The Shore scleroscope hardness of each product was determined. The products were then molded at 150° C. into test pieces and the tensile strength and impact strength of the pieces were determined as in Example 1. Table II gives the composition of each reaction mixture and the properties of the resinous products.

Table II

| Reaction mixture | | Shore hardness, as polymerized | Tensile strength | Impact strength |
|---|---|---|---|---|
| Styrene | Ethyl vinyl benzene | | | |
| Percent | Percent | | Lbs. per sq. in. | Inch-lbs. |
| 100 | 0 | 88 | 5,420 | 0.9 |
| 99 | 1 | 90 | 7,060 | 0.9 |
| 95 | 5 | 89 | 6,800 | 1.0 |
| 90 | 10 | 90 | 6,300 | 0.9 |
| 85 | 15 | 90 | 5,880 | 1.0 |
| 80 | 20 | 91 | 5,670 | 1.1 |
| 75 | 25 | 86 | 5,950 | 0.9 |
| 70 | 30 | 85 | 5,570 | 0.8 |
| 60 | 40 | 84 | 5,520 | 0.6 |
| 50 | 50 | 86 | 4,720 | 0.7 |
| 40 | 60 | 83 | 4,520 | 0.5 |
| 25 | 75 | 82 | 4,400 | 0.4 |
| 20 | 80 | 80 | 4,400 | 0.5 |
| 10 | 90 | 78 | 4,080 | 0.5 |
| 5 | 95 | 81 | 4,800 | 0.6 |
| 1 | 99 | 78 |  | 0.6 |
| 0 | 100 | 76 | 4,040 | 0.6 |

Example 3

A polymer of styrene, a co-oplymer of a mixture of about 20 per cent ortho-, 50 per cent meta-, and 30 per cent para- isopropyl vinyl benzene (which mixture is hereinafter referred to as "isopropyl vinyl benzene") and a series of co-polymers of styrene with the isopropyl vinyl benzene were prepared by heating the reactants at a temperature of 125° C. for about 72 hours.

The Shore scleroscope hardness of each resinous product was determined. The resins were then molded at 150° C. into test pieces and the tensile strength and impact strength of each piece was determined as in Example 1. Table III gives the composition of each reaction mixture and the properties of the resin obtained therefrom.

*Table III*

| Reaction mixture | | Hardness | Tensile strength | Impact strength |
|---|---|---|---|---|
| Styrene | Isopropyl vinyl benzene | | | |
| Percent | Percent | | Lbs. per sq. in. | Inch-lbs. |
| 100 | 0 | 88 | 5,420 | 0.9 |
| 99 | 1 | 86 | 6,160 | 0.9 |
| 95 | 5 | 79 | 5,580 | 0.8 |
| 90 | 10 | 89 | 6,720 | 1.1 |
| 85 | 15 | 89 | 7,120 | 1.1 |
| 80 | 20 | 91 | 5,940 | 0.9 |
| 75 | 25 | 89 | 6,560 | 1.2 |
| 70 | 30 | 90 | 6,890 | 1.0 |
| 50 | 50 | 86 | 6,710 | 1.1 |
| 40 | 60 | 86 | 5,650 | 0.8 |
| 25 | 75 | 85 | 6,000 | 1.0 |
| 20 | 80 | 85 | 5,700 | 0.8 |
| 10 | 90 | 84 | 4,960 | 0.7 |
| 5 | 95 | 83 | 4,960 | 0.6 |
| 1 | 99 | 83 | 5,950 | 0.9 |
| 0 | 100 | 81 | 4,640 | 0.6 |

*Example 4*

The co-polymers of styrene and diethyl vinyl benzene prepared as in Example 1 were tested to determine whether or not they would dissolve in toluene, carbon tetrachloride, ethylene chloride, or ethyl acetate, each of which solvents is capable of dissolving polystyrene. Table IV below indicates the per cent by weight of styrene and diethyl vinyl benzene in the mixtures thereof from which the copolymers were prepared and the solubility of the co-polymers in the above-named solvents. In the table the symbol "S" indicates that the co-polymer dissolved in the solvent, whereas the term "gel" indicates that the co-polymer swelled to a gel but did not dissolve appreciably when contacted with the solvent.

TABLE IV

| Reaction mixture | | Solvents | | | |
|---|---|---|---|---|---|
| Styrene | Diethyl vinyl benzene | $C_6H_5CH_3$ | $CCl_4$ | $C_2H_4Cl_2$ | Ethyl acetate |
| Percent | Percent | | | | |
| 99 | 1 | S | S | S | S |
| 95 | 5 | S | S | S | S |
| 75 | 25 | S | S | S | S |
| 50 | 50 | Gel | Gel | Gel | Gel |

*Example 5*

The co-polymers of styrene and ethyl vinyl benzene prepared as in Example 2 were tested as described in Example 4 to determine whether they would dissolve the solvents toluene, carbon tetrachloride, ethylene chloride and ethyl acetate. Table V describes the resins tested and the results of the tests. The symbols used to indicate the behavior of a resin in contact with a solvent are the same as were employed in Example 4, except that the additional symbol "X" is used to indicate that a granular resin swells somewhat but remains as distinct particles without dissolving appreciably when contacted with a solvent.

TABLE V

| Reaction mixture | | Solvents | | | |
|---|---|---|---|---|---|
| Styrene | Ethyl vinyl benzene | $C_6H_5CH_3$ | $CCl_4$ | $C_2H_4Cl_2$ | Ethyl acetate |
| Percent | Percent | | | | |
| 99 | 1 | S | S | S | S |
| 95 | 5 | S | S | S | S |
| 90 | 10 | S | S | S | S |
| 85 | 15 | S | S | S | S |
| 80 | 20 | S | S | S | S |
| 75 | 25 | S | S | S | S |
| 70 | 30 | S | S | S | S |
| 60 | 40 | Gel | Gel | Gel | Gel |
| 50 | 50 | Gel | Gel | Gel | X |
| 40 | 60 | S | S | S | S |
| 25 | 75 | Gel | Gel | Gel | Gel |
| 20 | 80 | Gel | Gel | Gel | Gel |
| 10 | 90 | Gel | Gel | Gel | Gel |
| 5 | 95 | Gel | Gel | Gel | Gel |
| 1 | 99 | Gel | Gel | Gel | Gel |

*Example 6*

The co-polymers of styrene and isopropyl vinyl benzene prepared as in Example 3 were tested in accordance with the procedure in Examples 4 and 5 to determine whether they would dissolve in usual solvents for polystyrene. Table VI describes the reaction mixture used in preparing each resin and the results of the solubility tests.

*Table VI*

| Reaction mixture | | Solvents | | | |
|---|---|---|---|---|---|
| Styrene | Isopropyl vinyl benzene | $C_6H_5CH_3$ | $CCl_4$ | $C_2H_4Cl_2$ | Ethyl acetate |
| Percent | Percent | | | | |
| 99 | 1 | S | S | S | S |
| 95 | 5 | S | S | S | S |
| 90 | 10 | S | S | S | S |
| 85 | 15 | S | S | S | S |
| 80 | 20 | Gel | Gel | Gel | Gel |
| 75 | 25 | Gel | Gel | Gel | Gel |
| 70 | 30 | Gel | Gel | Gel | Gel |
| 50 | 50 | X | X | X | X |
| 40 | 60 | X | X | X | X |
| 25 | 75 | X | X | X | X |
| 20 | 80 | X | X | X | X |
| 10 | 90 | X | X | X | X |
| 5 | 95 | X | X | X | X |
| 1 | 99 | X | X | X | X |

The co-polymerization of styrene with nuclear alkylated styrenes as hereinbefore described may, of course, be carried out in the presence of plasticizing agents, dyes, pigments, fillers, etc., when such added substances are desired in the resinous products.

Other modes of applying the principle of the invention may be employed instead of those explained, change being made as regards the method or products herein disclosed, provided the steps or compounds stated by any of the following claims or the equivalent of such stated steps or compounds be employed.

We therefore particularly point out and distinctly claim as our invention:

1. A resinous co-polymer of styrene with a nuclear alkaylated styrene, which co-polymer contains, in chemically combined form, an appreciable proportion of each of said compounds.

2. A resinous co-polymer of styrene with a nuclear alkylated styrene containing at least two carbon atoms in the alkyl portion of the molecule, which co-polymer contains, in chemically combined form, an appreciable proportion of each of said compounds.

3. A resinous co-polymer of styrene and a nuclear alkylated styrene having an alkyl radical containing at least two carbon atoms, which co-polymer contains, in chemically combined form, an appreciable proportion of each of said compounds.

4. A resinous co-polymer of styrene with a multiplicity of nuclear alkylated styrenes, which co-polymer contains, in chemically combined form, an appreciable proportion of styrene and an appreciable proportion of the nuclear alkylated styrenes.

5. A resinous co-polymer of styrene and diethyl vinyl benezene, which co-polymer contains, in chemically combined form, an appreciable proportion of each of said compounds.

6. A resinous co-polymer of styrene and ethyl vinyl benezene, which co-polymer contains, in chemically combined form, an appreciable proportion of each of said compounds.

7. A resinous co-polymer of styrene and isopropyl vinyl benzene, which co-polymer contains, in chemically combined form, an appreciable proportion of each of said compounds.

8. The method which comprises polymerizing styrene together with a nuclear alkylated styrene, each of said compounds being employed in appreciable proportion.

ROBERT R. DREISBACH.
SYLVIA M. STOESSER.